United States Patent Office 3,270,789
Patented Sept. 6, 1966

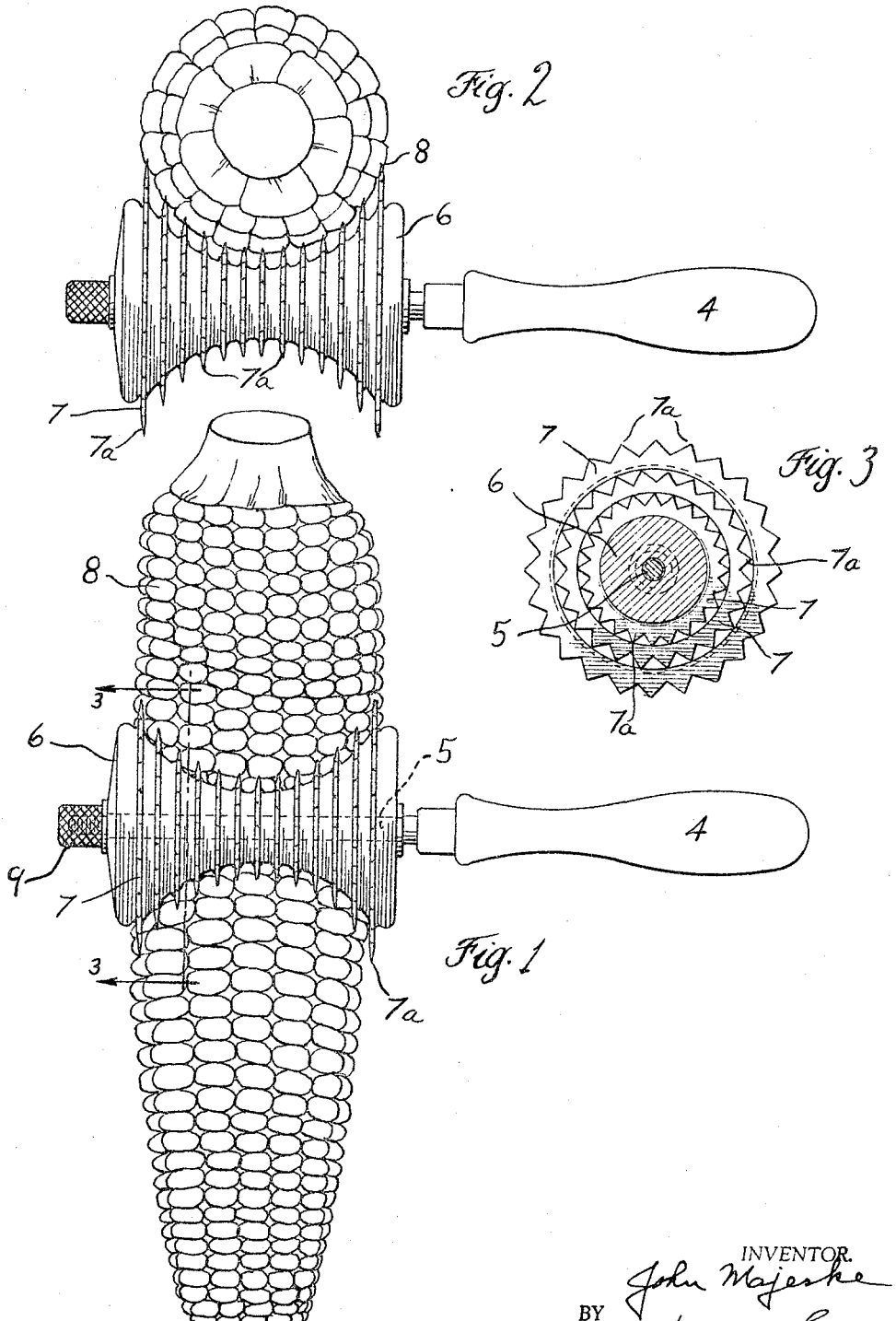

3,270,789
CORN TENDERIZER
John Majeske, 2835 Garrett Road, Drexel Hill, Pa.
Filed Feb. 11, 1964, Ser. No. 343,971
3 Claims. (Cl. 146—203)

This invention relates to a device or utensil for tenderizing corn on the cob.

The principal object of the invention is to provide a very simple tool with which it is possible to either lightly or deeply break through the skins of the kernels of an ear of corn so as to permit the butter to enter the interior of the kernels as well as to facilitate the removal of the meat while leaving the major portion at least of the skins adhering to the cob, thereby rendering the corn not only more flavorful but also more digestible.

Another object is to provide a utensil of the kind described which, by a mere change in the pressure with which it is applied, is capable either of merely lightly perforating the skins of the kernels or of more deeply and extensively cutting them whereby to render the tool readily adaptable for use both on ears of young and tender kernels and on ears of more mature and tougher kernels.

Still further objects are to provide a device of the character described which is easy to clean and maintain in a sanitary condition, which is easy to operate at the dining table, which will require a minimum number of strokes or motions in order to accomplish the desired results and which can be simply and inexpensively manufactured and capable of being sold at a modest price.

How the foregoing objects and advantages are attained is illustarted in preferred form in the accompanying drawing, wherein FIGURE 1 is a plan view of my improved corn tenderizing device shown as it will be applied to an ear of corn to accomplish the purposes described;

FIGURE 2 is an end view of the device as shown in FIGURE 1; and

FIGURE 3 is a section taken as indiacted by the line 3—3 in FIGURE 1.

In the preferred form illustrated my device consists of a handle member 4 having an axle-like shaft portion 5 on which latter portion is mounted a drum-like, kernel-perforating member 6. The concave drum or spool-like member is rotatable on the shaft and its outer surface is contoured to embrace the curvature of the surface of an ear of corn, as shown to best advantage in FIGURE 2. On the drum are arranged a plurality of radially disposed cutting members 7 each of which is provided with an annular series of teeth 7a. These members with their teeth follow the contour of the drum so that they also embrace the outer surface of the ear of corn with the points of the teeth being designed and positioned to perforate the skins of the kernels 8 as the device is moved axially of the ear in the manner which is obvious from the drawing. The rotatable member has a central axial bore so that it can be slipped over the end of shaft 5 and held in place by a knurled nut 9 or in any other suitable manner.

While I prefer the modification illustrated in the drawing, it is obvious that the kernel-perforating and cutting means could be constructed in some other manner, as by a series of individual toothed cutting wheels properly spaced upon the shaft 5 and graduated in size from a small diameter at the center to a large diameter at each side.

By making the device in the preferred manner illustrated herein it is exceedingly easy to clean and maintain it in a sanitary condition and rusting and corrosion can be avoided by employing an inexpensive plastic material from which to form the drum with the kernel-perforating and cutting means projecting therefrom.

It will be noticed from the drawing that the curvature of the perforating and cutting means is such as to embrace approximately one-third of the surface of the circumference of an ear of corn, although this, naturally, would vary depending upon the size of the ear, but it is obvious tht the shape of my improved device is such as to make it possible to use it at the table with a minimum number of strokes. The teeth will perforate the skins or hulls of the kernels and by increasing the pressure a deeper cut is possible if necessary or desirable. The effect of the tool is to render the corn more taste-satisfying and digestible because the skins of the kernels, while broken, are not completely parted from the cob and will largely adhere thereto as the corn is eaten.

What I claim is:

1. A device for treating corn in situ on the cob, comprising an elongated handle, an axle-like shaft extending lengthwise from said handle, an integral concave-spool-like member of varying cylindrical cross section rotatably mounted on said shaft with its axis substantially in alignment with the handle, said member having its minimum cylindrical cross section at the mid-region of its length and its maximum cylindrical cross section at its ends, whereby it is contured to embrace a portion of the curved surface of an ear of corn when the latter is held at right angles to the axis of the shaft and handle, and a plurality of radially disposed kernel-piercing teeth formed integrally on the concave surface of said spool-like member and configured to pierce the kernels, while leaving their hulls in place, as the said member rotates when passed along an ear of corn held at right angles to the handle.

2. A device for treating corn in situ on the cob, comprising an elongated handle, an axle-like shaft mounted on said handle, an integral concave-spool-like member of varying cylindrical cross section having a central axial bore whereby it is rotatably mounted on said shaft, said member having its minimum cylindrical cross section at the mid-region of its length and its maximum cylindrical cross section at its ends, whereby it is contoured to embrace a portion of the curved surface of an ear of corn when the latter is held at right angles to the axis of the shaft, and a plurality of radially disposed kernel-piercing teeth formed integrally on the concave surface of said spool-like member and configured to pierce the kernels, while leaving their hulls in place, as the said member rotates when passed along an ear of corn held at right angles to the axis of said member.

3. A device according to claim 2 wherein said spool-like member with its integral teeth is of solid plastic material, so that said teeth may easily enter and leave the kernels and may also be readily cleaned.

References Cited by the Examiner

UNITED STATES PATENTS

| | | | |
|---|---|---|---|
| 790,228 | 5/1905 | Rohrer | 146—204 |
| 1,799,588 | 4/1931 | Hurlburt | 146—4 |
| 2,694,399 | 11/1954 | Parker et al. | |

ROBERT C. RIORDON, *Primary Examiner.*

W. GRAYDON ABERCROMBIE, *Examiner.*